United States Patent
Papstein

(10) Patent No.: US 9,552,079 B2
(45) Date of Patent: Jan. 24, 2017

(54) METHOD, ELECTRONIC DEVICE AND SYSTEM FOR REMOTE TEXT INPUT

(71) Applicant: Swisscom AG, Bern (CH)

(72) Inventor: Guy Papstein, Zürich (CH)

(73) Assignee: SWISSCOM AG, Bern (CH)

( * ) Notice: Subject to any disclaimer, the term of this patent is extended or adjusted under 35 U.S.C. 154(b) by 29 days.

(21) Appl. No.: 14/264,845

(22) Filed: Apr. 29, 2014

(65) Prior Publication Data

US 2014/0320398 A1  Oct. 30, 2014

(30) Foreign Application Priority Data

Apr. 29, 2013  (EP) ................................ 20130165852

(51) Int. Cl.
```
G09G 5/00       (2006.01)
G06F 3/023      (2006.01)
H04M 1/725      (2006.01)
H04N 21/41      (2011.01)
H04N 21/475     (2011.01)
H04N 21/4788    (2011.01)
```

(52) U.S. Cl.
CPC .......... *G06F 3/0233* (2013.01); *H04M 1/7253* (2013.01); *H04M 1/72552* (2013.01); *H04N 21/4126* (2013.01); *H04N 21/4751* (2013.01); *H04N 21/4788* (2013.01)

(58) Field of Classification Search
None
See application file for complete search history.

(56) References Cited

U.S. PATENT DOCUMENTS

| | | | | |
|---|---|---|---|---|
| 6,393,297 | B1* | 5/2002 | Song | G08B 13/1418 340/870.02 |
| 7,054,654 | B1* | 5/2006 | Sladek | H04W 88/184 370/260 |
| 2003/0048174 | A1* | 3/2003 | Stevens et al. | 340/5.64 |
| 2003/0078032 | A1* | 4/2003 | Pei | G08C 17/02 455/411 |

(Continued)

FOREIGN PATENT DOCUMENTS

| CN | 202103740 U | 1/2012 |
|---|---|---|
| CN | 102395012 | 3/2012 |

(Continued)

OTHER PUBLICATIONS

European Patent Office, Communication with extended European search report, in Application No. 13165862.8, dated Oct. 15, 2013. (4 pages).

*Primary Examiner* — Ilana Spar
*Assistant Examiner* — Kirk Hermann
(74) *Attorney, Agent, or Firm* — McAndrews, Held & Malloy, Ltd.

(57) ABSTRACT

A method, electronic device, and system for remote text input in the electronic device are provided. A display signal may be outputted in the electronic device, displaying a text field for inputting text (e.g., by the user of the electronic device). A request for text input may be sent from the electronic device to another device (e.g., a communication device) which may be addressed by an identifier of the other device (e.g., a SIM of the communication device). The electronic device may then receive the requested text input from the other device (e.g., once the user of the other device enters the requested text).

15 Claims, 4 Drawing Sheets

(56) References Cited

U.S. PATENT DOCUMENTS

| | | | |
|---|---|---|---|
| 2005/0208933 A1* | 9/2005 | Hospes | H04M 1/66 455/419 |
| 2008/0051118 A1* | 2/2008 | Shin | H04W 4/02 455/466 |
| 2008/0062337 A1* | 3/2008 | Maier | G08C 17/00 348/734 |
| 2008/0246733 A1 | 10/2008 | Henty | |
| 2008/0268882 A1* | 10/2008 | Moloney | H04L 51/18 455/466 |
| 2009/0113417 A1* | 4/2009 | Vrijsen | H04N 5/4403 717/178 |
| 2009/0265552 A1* | 10/2009 | Moshir et al. | 713/168 |
| 2009/0298535 A1* | 12/2009 | Klein | H04N 21/43615 455/556.1 |
| 2010/0099396 A1 | 4/2010 | Huq et al. | |
| 2010/0197293 A1* | 8/2010 | Shem-Tov | 455/420 |
| 2011/0052144 A1 | 3/2011 | Abbas et al. | |
| 2011/0087348 A1* | 4/2011 | Wong | H04L 12/58 700/94 |
| 2011/0248959 A1* | 10/2011 | Diehl | G06F 3/0236 345/175 |
| 2011/0256905 A1* | 10/2011 | Ryan | G06F 1/1632 455/556.1 |
| 2011/0273625 A1* | 11/2011 | McMahon et al. | 348/734 |
| 2011/0289532 A1 | 11/2011 | Yu et al. | |
| 2012/0127081 A1* | 5/2012 | Lin | G06F 3/021 345/169 |
| 2012/0146918 A1* | 6/2012 | Kreiner | H04M 1/7253 345/173 |
| 2012/0151525 A1 | 6/2012 | Demchenko et al. | |
| 2012/0151527 A1 | 6/2012 | Kumar et al. | |
| 2012/0162537 A1 | 6/2012 | Maddali et al. | |
| 2012/0200489 A1* | 8/2012 | Miyashita | G06F 3/0233 345/156 |
| 2012/0266069 A1* | 10/2012 | Moshiri | G06F 3/0346 715/719 |
| 2012/0276891 A1* | 11/2012 | Bai | G08C 17/02 455/420 |

FOREIGN PATENT DOCUMENTS

| | | | |
|---|---|---|---|
| GB | 2488109 | | 8/2012 |
| GB | 2488109 A | * | 8/2012 |
| KR | 20110038853 | | 4/2011 |
| WO | 03024107 | | 3/2003 |

* cited by examiner

METHOD, ELECTRONIC DEVICE AND SYSTEM FOR REMOTE TEXT INPUT

CLAIM OF PRIORITY

Pursuant to 35 U.S.C. §119, this patent application claims the filing date benefit of and right of priority to European (EP) Patent Application No. 20130165852, which was filed on Apr. 29, 2013. The above stated application is hereby incorporated herein by reference in its entirety.

FIELD

The present disclosure relates to electronic devices and use thereof. More specifically, certain embodiments of the disclosure relate to a method for enabling remote text input in an electronic device, as well as an electronic device and a system corresponding thereto.

BACKGROUND

While some electronic devices such as personal computers have specialized keyboards for text input, other electronic devices may not provide adequate user controls to input text. For example, some electronic devices may have only a remote control which is normally very simple and comprises only the main function of the electronic device, but not a keyboard for inputting text. Various solutions are available in the state of the art, but remain inadequate.

For example, many electronic devices (e.g., those with simple remote controls) may provide a display based keyboard. The keys of the keyboard are chosen by using four direction keys to navigate on the display based keyboard and a fifth key to confirm each selected keyboard key. This may keep the remote control simple without requiring any additional keys for the remote control, but text input is very time consuming and very often stops users from using functions of the TV requiring text input.

QWERTY-keyboards as used with personal computers can be connected wirelessly to the electronic device and provide an effective tool for text input. However, for most functions of the electronic device, a QWERTY-keyboard is much too complex and too big so that the advantages of the text input are offset by the disadvantages of this kind of remote control. In some cases the QWERTY-keyboards are reduced in size, which always raises the problem of the trade-off between size of a key and size of the remote control. In addition, the text input by the QWERTY keyboard can only be checked on a display of the electronic device so that the user has to change his view always between the display which may be far away and the keyboard. This is already a burden for people with good eyes, but becomes a serious barrier for person with different defects of vision for the distance and the vicinity.

An alternative method to input text is use of a number field. For example, number 1 (or key corresponding thereto) may be used to input A, B or C, the number 2 may be used to enter D, E or F, etc. This input method is well-known in mobile phones, but is used less and less with the rise of smartphones which also use a full keyboard. In addition, this method also requires controlling the input via the display of the device.

Recently, devices such as smartphones may be directly used as remote controls for the electronic device. This has the advantages that the user can use the text input well known to the user by daily use of a smartphone, and that the user can also see text input directly on the smartphone while typing. However, for each electronic device, the user has to download an application for the remote control of the electronic device. On the other side, the manufacturer of electronic devices being controlled has to offer for each type of smartphone or each type of operating system of a smartphone, an application and update the applications with each version of the smartphone operating system. Therefore the installation and maintenance of those applications are cumbersome for the manufacturer and the user.

Similar issues exist in various video signal devices, such as televisions, set-top boxes (STBs), video recorder, etc. In this regard, none of the presented solutions of the state of the art are suitable for text input.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY

A system and/or method is provided for remote text input, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

Various features and advantages of the disclosure will become apparent from the following description of non-limiting example embodiments, with reference to the appended drawings, in which.

DETAILED DESCRIPTION

Figure 1:
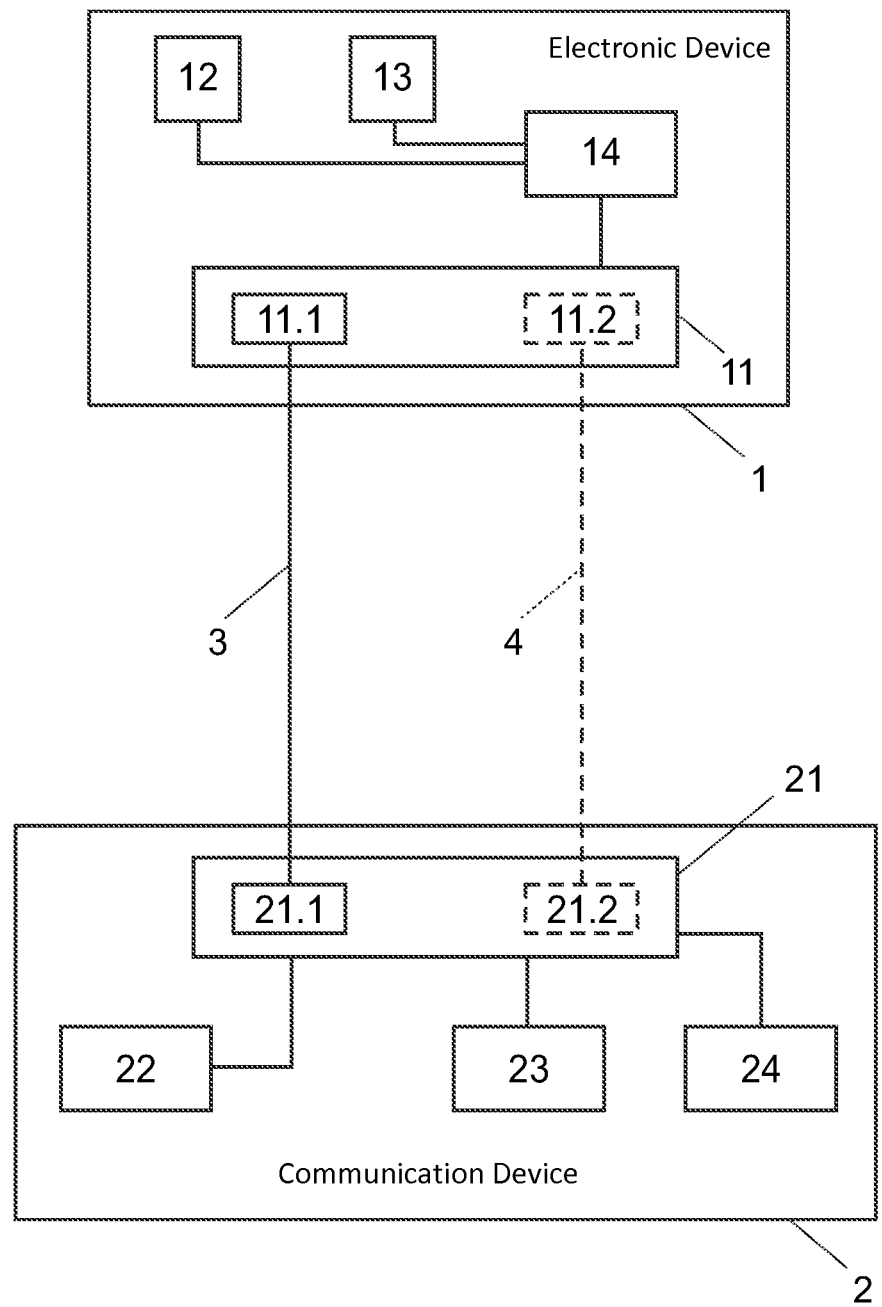
FIG. 1 illustrates an example embodiment of the system for remote text input.

As utilized herein the terms "circuits" and "circuitry" refer to physical electronic components ("hardware") and any software and/or firmware ("code") which may configure the hardware, be executed by the hardware, and or otherwise be associated with the hardware. As used herein, for example, a particular processor and memory may comprise a first "circuit" when executing a first plurality of lines of code and may comprise a second "circuit" when executing a second plurality of lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be performed by one or more circuits. As utilized herein, the term "example" means serving as a non-limiting example, instance, or illustration. As utilized herein, the terms "for example" and "e.g.," introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Certain embodiments of the present disclosure may be found in a method and system for remote text input, as described in the following in more detail with reference to the attached figures. In this regard, as explained in more detail above, while some electronic devices such as personal computers may have specialized keyboards for text input, many electronic devices may not provide adequate user controls to support input text. In particular, the disclosure provides a method, system and electronic device for remote text input on the electronic device, which provides simple and easy remote control for the main functions of the electronic device, but which may still provide an effective text input for a user without the necessity of performing complex actions (e.g., installations of apps).

A method for remote text input to an electronic device may comprise, for example, initially outputting a display signal displaying a text field for inputting text. A request for text input may then be sent from the electronic device to a communication device, which may be addressed by an identifier of the communication device (e.g., identifier of an identity module of the communication device). At the electronic device, the requested text input subsequently may be received from the communication device (e.g., after the requested text input is entered into the communication device).

A method for remote text input to an electronic device via a communication device may comprise the following: a request for text input is received from the electronic device by the communication device, wherein the request may address the communication device on the basis of an identifier of the communication device (e.g., stored in an identity module of the communication device); a text input is received from the user interface of the communication device; and the text input may be sent from the communication device to the electronic device.

An electronic device in accordance with the present disclosure may comprise: a display configured to output a display signal displaying a text field for inputting text; a communication component configured to send information to a communication device addressed by an identifier of the communication device, and to receive information from the communication device; a processor configured to control the display to output a display signal displaying a text field for inputting text, and to control the communication component to send a request for text input to the communication device, and to receive the requested text input from the communication device. Sending the request for text input to the communication device may be in response to receiving from a user control device (or component), a selection to input the text in the text field using the communication device.

The present disclosure may allow for using a standardized communication path on the basis of the identification information stored in identity modules used, e.g., in mobile cellular telephone networks. This may allow to connecting such communication devices as smartphones with electronic devices without any complex download and installation steps. The user simply may have to enter once an identifier of the communication device (e.g., smartphone's identifier, such as a phone number assigned to the user/smartphone) in the electronic device, and the user can use thereafter the communication device for text input in the electronic device. This has the advantage of allowing users to use familiar functions of text input offered by well-known communication devices. This is particularly advantageous for electronic devices that may require text input but lack convenient means for doing so (e.g., video signal devices like televisions, set top boxes, video recorder, etc.). The disclosure is not restricted to or dependent on any particular type of electronic device, however.

In one example embodiment, in response to outputting the display signal, a selection to input the text via a communication device may be received from a user control device (or component) of the electronic device.

In one example embodiment, the user control device (or component) of the electronic device may be a remote control. In this regard, the present disclosure may be particularly advantageous for electronic devices with remote controls, because most remote controls have only rudimentary keys which are not suitable enough for a comfortable text input. Therefore, it is convenient to choose with the simple remote control the function of the text input via a communication device and use the comfortable functions for text input of the communication device.

In one example embodiment, the user control device (or component) may be different from the communication device. In this regard, the present disclosure may be advantageous for user controls of electronic devices which are different from the communication devices.

In one example embodiment, the identifier of the communication device may be one of a telephone number corresponding to a SIM as identity module and an IMSI corresponding to the SIM. In this regard, use the telephone number of the communication device as identifier may be particularly advantageous, since the user will normally know the phone number, and as such the user can very conveniently configure the text input via the communication device by entering the phone number.

In one example embodiment, the selection to input the text via a communication device may comprise the input of the identifier of the communication device (or an identity module thereof). This input may be performed by selecting the identifier out of a list, or by entering the identifier by the user control device (or component) of the electronic device.

In one example embodiment, the request may be sent over a mobile phone network and the identifier may be an identifier of the mobile cellular telephone network (or identifier of the communication device within the mobile cellular telephone network). This may be particularly advantageous because communication over mobile cellular telephone networks is highly standardized, such that each communication device suitable for communication with the mobile cellular telephone network may be configured to receive a request over the mobile cellular phone network without any configuration of the communication device.

In some example embodiments, the request may be sent in a SMS message. The SMS message sent in this manner may comprise, for example, a telephone number of origin as origin of the SMS message. The electronic device may receive the requested text input from a response SMS message sent back to the telephone number of origin. Such embodiments may be advantageous because a user of the communication device may use SMS messages as a back-channel by simply answering the request of the electronic device.

In one example embodiment, the request may comprise a link to the Internet, where the link comprises, for example, a text input field, and the electronic device may receive the requested text input from the link. This embodiment may have the advantage that a large number of text input fields may be sent in one request, such as by creating a webpage with all requested text fields, and by sending only the link to this webpage to the communication device. Since the access of webpages is highly standardized and possible by nearly all communication devices, this may allow a simple back-channel.

In one example embodiment, the link may be created uniquely for at least one of each request and of each electronic device.

In one example embodiment, the request may comprise the address of the electronic device in a local connection, and the requested text input may be received at the electronic device via the local connection.

In one example embodiment, the method may comprise outputting a display signal displaying the requested text input received at the electronic device and confirming the text input by the user control device (or component) of the electronic device. This may have the advantage that the electronic device may be mainly controlled via the user control device (or component) of the electronic device, and the text input may be realized via the communication device which is more adapted for text input.

In one example embodiment, the method may comprise receiving the request at the communication device, receiving text input by the user interface of the communication device and sending the text input from the communication device to the electronic device.

FIG. 1 illustrates an example embodiment of the system for remote text input. Referring to FIG. 1, there is shown a system comprising an electronic device 1 and a communication device 2.

Each of the electronic device 1 and the communication device 2 may comprise suitable circuitry for implementing various aspects of the present disclosure, including, at least, functions and/or operations attributed thereto. For example, as shown in the example embodiment depicted in FIG. 1, the electronic device 1 may comprise a communication component 11, a user control component 12, a display 13 and a processor 14. The communication device 2 may comprise a communication component 21, a text input component 22, a display 23 and an identity module 24. Examples of communication devices 2 are mobile phones, smartphones, tablets, portable computers, or the like. The disclosure is not limited, however, to any particular type of electronic and/or communication devices.

The electronic device 1 may be connected to the communication device 2, such as over a first communication connection 3, and in some cases also over a second communication connection 4. For example, the electronic device 1 may be configured to receive text input (e.g., over the first communication connection 3), and/or to handle or process the received text input. The communication device 2 may be configured to receive a request from the electronic device 1, to input text and to transfer the text input back to the electronic device 1.

The first communication connection 3 may be any communication link suitable for data transfer. The first communication connection 3 may comprise any Internet Protocol (IP) or also circuit-switched communication protocols, over fixed or mobile communication links including, optical fibre, copper links, satellite links, etc. The system and method disclosed herein may be operable over any type of data link. The first communication connection 3 may comprise, for example, a mobile cellular network such as a mobile cellular telephone network, Global System for Mobil Communications (GSM), Universal Mobile Telecommunications System (UMTS), Long Term Evolution (LTE) or other mobile phone standards defined by the European Telecommunications Standards Institute (ETSI). The first communication connection 3 may also comprise a connection over an Internet protocol (IP) and over a mobile cellular network. For example, the first communication connection 3 may provide an Internet connection between the electronic device 2 and a server and provide a mobile cellular network between the server and the communication device 2.

The second communication connection 4 may comprise a local communication connection between the electronic device 1 and the communication device 2. Examples for a local communication connection 4 are Bluetooth (registered trademark), Wireless Local Area Network (WLAN) or an Infrared link. The second communication connection 4 is not necessary for all embodiments, but might be useful for some example embodiments.

The communication component 21 may be configured to enable communications by the communication device 2 (e.g., with the electronic device 1). In this regard, the communication component 21 may comprise a first communication sub-component 21.1 and a second communication sub-component 21.2. The first communication sub-component 21.1 may be configured to communicate over the first communication connection 3 with the electronic device 1. In an example embodiment, where the communication device 2 is connected via an Internet connection, the first communication sub-component 21.1 may configured to communicate using, e.g., IP over the first communication connection 3. In an example embodiment, where the communication device 2 is connected via a mobile cellular network, the first communication sub-component 21.1 is configured to communicate with the mobile cellular network on the basis of the corresponding protocols and standards. For example, the first communication sub-component 21.1 could be a GSM transceiver.

The identity module 24 may comprise an identifier which identifies the user of the communication device 2. The identifier may be suitable to identify the user of the communication device 2, for example, within a mobile cellular network or a mobile cellular telephone network. The identity module 24 may be a subscriber identity module (SIM). The SIM, in some instances, is a memory storing at least one identifier of a mobile cellular network. In most cases the international mobile subscriber number (IMSI) is used as the identifier or the telephone number corresponding to this IMSI. In one example embodiment, the identity module 24 is a physical card which is inserted in a slot of the communication device 2. In another example embodiment, the identity module 24 may be a so called virtual SIM or embedded SIM, which may store information of a SIM card directly in the communication device 2 or in another SIM card relating to another identifier. The identity module 24 may be connected with the first communication sub-component 21.1. The information of the identity module 24 may be used to identify the communication device 2 in the first communication connection 3 (e.g., within a mobile cellular network or the Internet).

The second communication sub-component 21.2 may be configured to communicate with the electronic device 1 over the second communication connection 4. The second communication sub-component 21.2 is only necessary, if a local communication connection 4 is desirable.

The text input component 22 may be configured to receive text information from a user. The text input component 22 may comprise a keyboard, a virtual keyboard displayed on a touchscreen, a number block which allows entering text by relating a certain amount of signs to single keys of the number block, voice recognition based input, etc. The disclosure is not restricted to a certain kind of text input of the communication device 2. One advantage of the present disclosure is that the text input at communication device 2 depends only on the potential text input possibilities of the communication device 2 to which the user of the communication device 2 is accustomed.

The display 23 may be configured to display the text input. The display 23 may not be necessary for all embodiments. However, if the communication device 2 comprises a display 23, the text input in the communication device 2 can be controlled on the display 23 of the communication device 2, and the electronic device 1 does not need a display or it is not necessary to show the text input on the screen of the electronic device 1. In some cases, the user wants to enter secret information like login information which he does not want to display at a display of the electronic device 1 which may be visible to others.

The communication component 11 of the electronic device 1 may be configured to enable communications by the electronic device (e.g., with the communication device 2). The communication component 11 may comprise a first communication sub-component 11.1 and a second communication sub-component 11.2. The first communication sub-component 11.1 is configured to communicate over the first communication connection 3 with the communication device 2. In example embodiments where the electronic device 1 is connected via an Internet connection, the first communication sub-component 11.1 may be configured to communicate using IP. In example embodiments where the electronic device 1 is connected via a mobile cellular network, the first communication sub-component 11.1 may be configured to communicate with the mobile cellular network on the basis of the corresponding protocols and standards. For example, the first communication sub-component 11.1 may be a GSM transceiver.

The second communication sub-component 11.2 may be configured to communicate with the communication device 2 over the second communication connection 4. The second communication sub-component 11.2 is only used if a local communication connection is desirable.

The user control component 12 may be configured to control the functions of the electronic device 1, and/or to receive user input for this control. In one example embodiment, the user control component 12 is a remote control which is connected to the electronic device by a wireless connection, e.g., Infrared, Bluetooth, or WLAN. In another example embodiment, the user control component 12 is integrally included in the electronic device 1. In a further example embodiment, the user control component 12 comprises a first part which is integrally connected in the electronic device 1 and a second part which corresponds to a remote control.

The display 13 may be configured to output (or display) information. For example, display 13 may be configured to output a display signal. The display 13 could also comprise a display which displays the display signal. However, a display is not necessary for all embodiments. For example, a set-top box (STB) as an electronic device 1 may also not have a display which shows the display signal output, but still has a display 13 which outputs a display signal to an external display.

The processor 14 may be configured to control at least the functional blocks of the electronic device 1 illustrated. The functions of the processor 14 are explained in more detail in relation with the method shown in FIG. 2.

Figure 2:
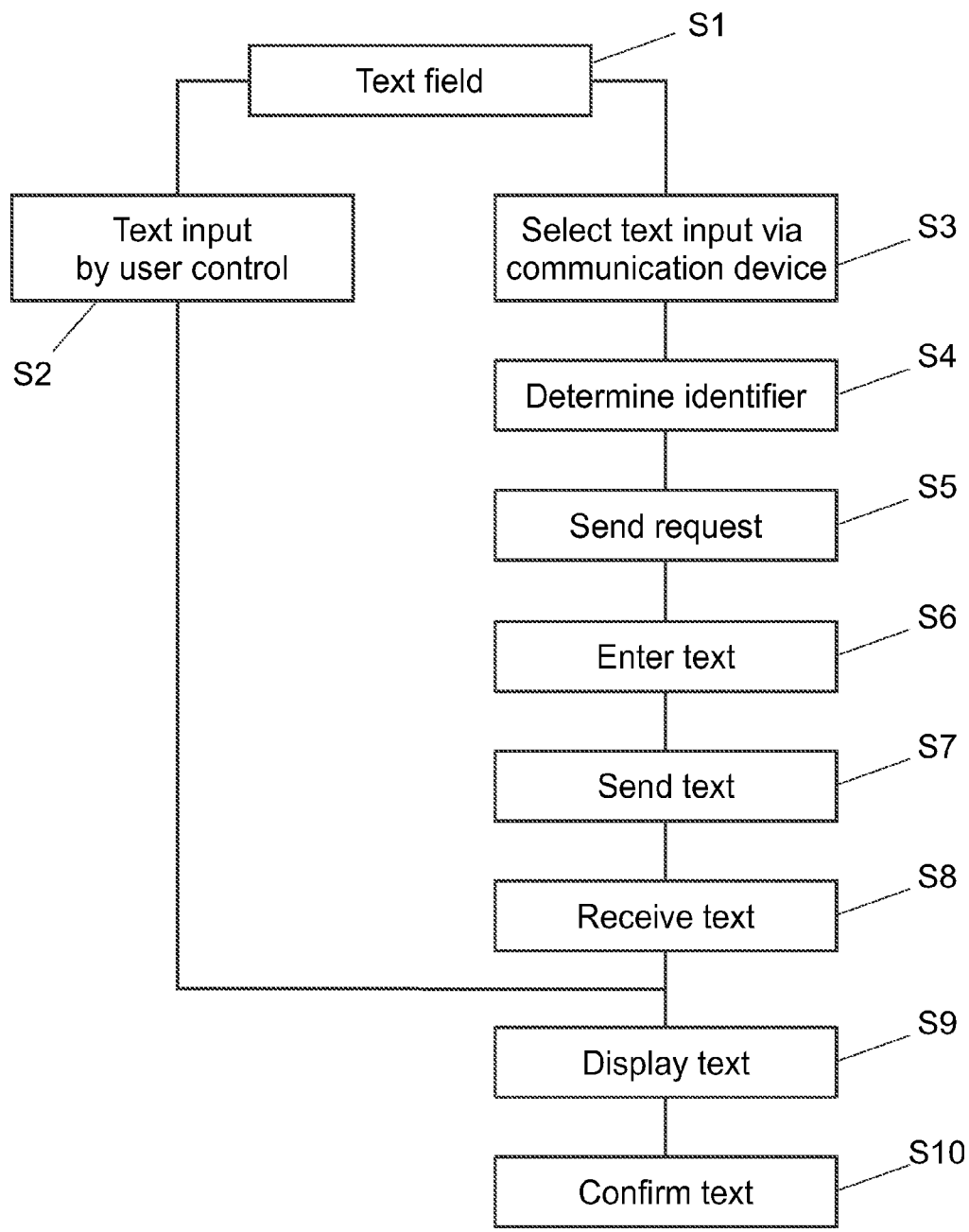
FIG. 2 illustrates an example process for remote text input.

FIG. 2 illustrates an example process for remote text input. Referring to FIG. 2, there is shown an example method for inputting text (e.g., via the communication device 2).

The processor 14 may be configured to output in a first step S1 via the display 13 a display signal with at least one text field for inputting text. In this regard, the display signal may be displayed on a display of the electronic device 1 or on a display of another device connected to the electronic device 1.

In response to outputting the display signal, the processor 14 may wait for receiving by the user control component 12 the text input directly in step S2, or the user input for selecting text input via a communication device 2 in step S3. The selection in step S2 may be realized by displaying in the display signal a button for text input via a communication device 2 which can be selected by the user control component 12, e.g., using arrow keys and a confirmation key of the user control component 12. Alternatively, the text input via the communication device 2 in step S3 can also be initiated by pressing a special key or combination of keys on the user control component 12. Nonetheless, the disclosure is limited to any particular way of selection, and any other way to input this selection that is suitable may be used (e.g., the selection can be realized by voice input). In some example embodiments, the text input via the communication device 2 may be automatically preselected so that steps S2 and S3 may be rendered superfluous.

If the processor 14 receives the user input for selecting the text input via a communication device 2 in step S3, or if this text input is automatically preselected, the processor 14 may determine in step S4 an identifier suitable for identifying and communicating with the communication device 2. This identifier may correspond to the identifier stored in the identity module 24 of the communication device 2. The identifier may be suitable to identify a user of the communication device 2. The identifier may be suitable to identify the user of the communication device 2 in the first communication connection 3. The identifier may be, e.g., the telephone number of the communication device 2. This telephone number may correspond to the IMSI stored in the SIM of the communication device 2. The identifier may be determined in the electronic device 1 by user input, by use of a preselected identifier, or based on rules for selecting at least one identifier from a set of preselected identifiers. In some instances, it may also be possible to determine more than one identifier, so that the text input could be provided by more than one communication device 2.

In step S5, the processor 14 may cause the communication component 11 to create a request, and to send the created request to the communication device 2 on the basis of the determined identifier of the communication device 2 to input text. Preferably, the communication component 11 may send an SMS with the request to the communication device 2. For example, the communication component 11, which may not be directly connected to the mobile cellular network, may connect over the Internet to a server which sends the request via SMS to the communication device 2. Instead of sending a SMS, an instant message which addresses an instant message ID corresponding to the identifier of the identity module 24 could be sent.

The user receives now the request for text input on the communication device 2. If an SMS is used for sending the request, it is guaranteed that a large number of communication devices 2 may receive and read the request from the electronic device 1, because receiving of SMS is standardized. Therefore, no special application is necessary to be downloaded and installed. In one example embodiment, the request may contain a link to the Internet comprising a text input field. Therefore, the user can open a text input field on the communication device 2 by selecting the link in the received SMS. In another example embodiment, the request may be sent in an executable message and could contain some information to establish a local connection 4 to the electronic device 1, and to configure the communication device 2 to directly control the electronic device 1 for text input.

In step S6, text may be entered. For example, the user may use the communication device 2 to input text. The text input may be entered in the request, e.g., the text field of the weblink or the text field of the electronic device 1 controlled by the communication device 2. This may have the advantage that the user may use any way of entering text of the communication device 2 with which the user is comfortable. On the other side, the user control component 12 of the electronic device 1, which is different from the communication device 2, may be kept very simple.

Once the text input is finished, the user may confirm the text input, and once confirmed the text input may be sent back to the electronic device 1 in step S7. In an example embodiment where weblink is utilized, a confirmation or send button of the corresponding website may be used to send the text input of the text field of the link to the electronic device 1. In an example embodiment where there is local control of the electronic device 1, the text may be already sent to the electronic device over the local connection 4, and the communication device 2 sends only the confirmation to the electronic device 1 in step S7.

In step S8, the processor 14 may receive, via the communication component 12, the text input from the communication device 2. In step S9, the processor 14 may cause the display 13 to output the display signal with the text field, which may also include now the received text input. In step S10, once the processor 14 receives from the user control component 12 a confirmation of the text input, the text input may be processed. Nonetheless, in some example embodiments, steps S9 and/or S10 may be superfluous—e.g., if the text input is processed directly when receiving the text input from the communication device 2. Further, if the user would directly input text over the user control component 12 in step S2, the method would jump directly to displaying the text input in step S9.

Figure 3A:
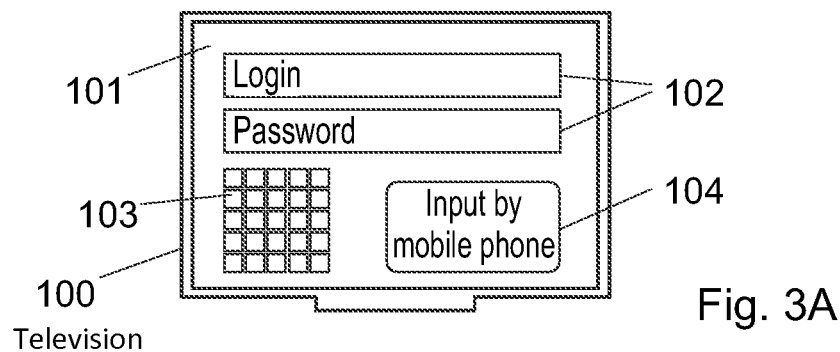
FIGS. 3A to 3E illustrate an example embodiment of the method for remote text input.

FIGS. 3A to 3E illustrate an example embodiment of the method for remote text input. In particular, FIG. 3A to 3E show example displayed user interfaces of a television 100 (as example of the electronic device 1) and a smartphone 200 (as example communication device 2), specifically during different method steps (e.g., the steps described with respect to FIG. 2). FIG. 3A illustrates the display signal 101 which may be displayed on a display of the television 100. The display signal 101 may comprise two text input fields 102, to enable entering authentication information (e.g., one field for a user/account/login name and another field for a password). The input of authentication information in this manner may have the additional advantage that third persons may not see the authentication information while inputting those in the electronic device 1. This may allow also that another user which normally does not use the electronic device 1 can safely enter his authentication information by his communication device 2. In addition, authentication information often requires special characters which require even more evolved text input measures. However, the disclosure is not restricted to input authentication information, but can be used for all kinds of text input. The display signal 101 may also comprise a display keyboard 103 and a button 104 for selecting text input via the communication device 2.

Figure 3B:
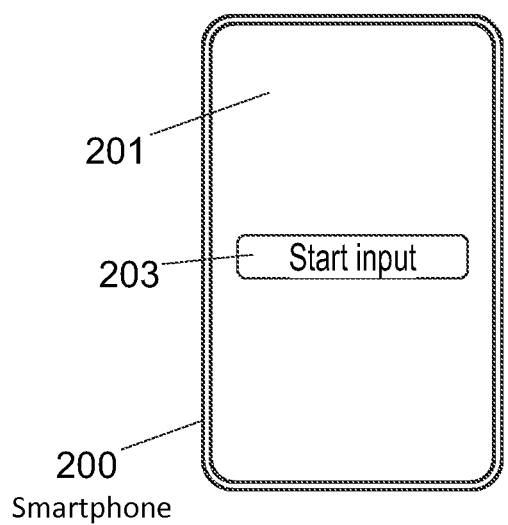

FIG. 3B illustrates a display signal 201, as displayed in the smartphone 200, to show the request received at the smartphone 200. The display signal 201 (request) may comprise a link 202, such as to a page in the Internet comprising the text field or the text fields for the requested text input. Once the user selects the link 202, a browser may be opened showing the link 202.

Figure 3C:
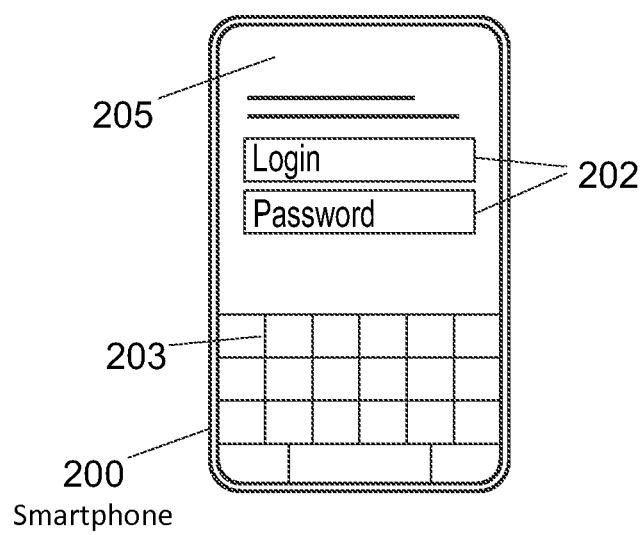

FIG. 3C illustrates a display signal 205, as displayed in the smartphone 200, with the link opened in the browser showing text input fields 202, corresponding to the text input fields 102 on the electronic device 1, as described with respect to FIG. 3A. The user may use all methods offered by the smartphone 200 to enter the text. For example, as shown in FIG. 3C, a display keyboard 203 may be opened on the touch screen of the smartphone 200 used for the text input.

Figure 3D:
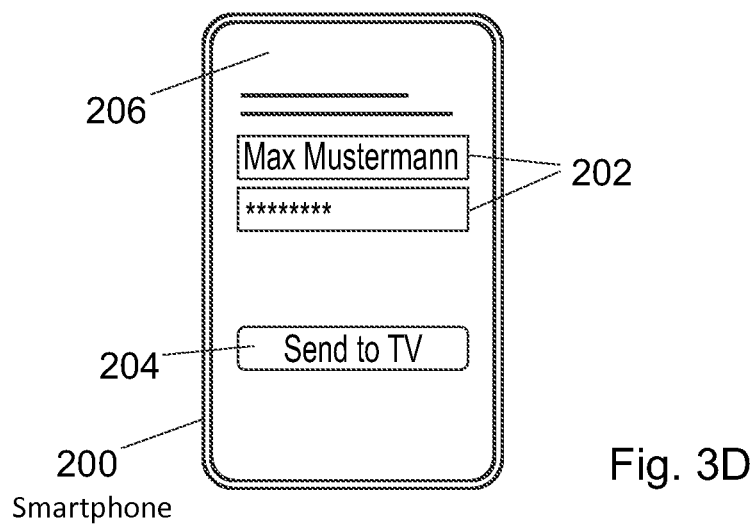

FIG. 3D illustrates a display signal 206, as displayed in the smartphone 200, with the link opened in a browser showing the text input fields 202 and the text input therein (e.g., as entered by user of the smartphone 200). The link may also comprise a button 204 for confirming the text input and sending the text input to the electronic device 1.

Figure 3E:
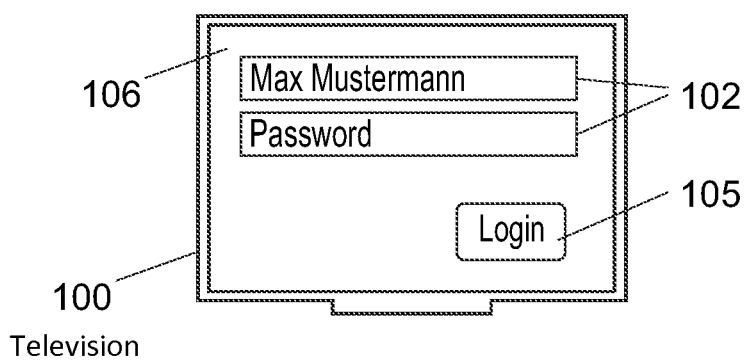

FIG. 3E illustrates a display signal 106, as displayed by the television 100. The display signal 106 may comprise the text fields 102, with the text input as received from the smartphone 200. The display signal 106 may also comprise a button 105, for confirming the text input.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, the present invention may be realized in hardware, software, or a combination of hardware and software. The present invention may be realized in a centralized fashion in at least one computer system, or in a distributed fashion where different units are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed:

1. A method for remote text input in an electronic device, comprising:

outputting a display signal for displaying a text field for receiving input comprising text entered by a user of the electronic device;

sending a request for text input from the electronic device to a communication device addressed by an identifier of an identity module of the communication device, wherein the communication device is also used by the user of the electronic device; and receiving at the electronic device the requested text input from the communication device, wherein:

obtaining the requested text input from the communication device comprises displaying the text field for inputting the text at the communication device, to enable the user of the electronic device to provide input requested at the electronic device by interacting instead with the communication device;

the request is sent over a mobile cellular network and the identifier is an identifier of the mobile cellular network;

the request is sent in a SMS message; and the SMS sent comprises a telephone number of origin as origin of the SMS and the electronic device receives the requested text input from an SMS sent to the telephone number of origin.

2. The method according to claim 1, comprising, in response to outputting the display signal, receiving from a user control device of the electronic device a selection to input the text over the communication device.

3. The method according to claim 2, wherein the user control device of the electronic device is a remote control.

4. The method according to claim 2, wherein the user control device is different from the communication device.

5. The method according to claim 1, wherein the identity module is a subscriber identity module and the identifier is a telephone number corresponding to the subscriber identity module.

6. The method according to claim 1, wherein the request comprises a link to the internet, the link comprises a text input field, and the electronic device receives the requested text input from a site corresponding to the link.

7. The method according to claim 1, wherein the request comprises address of the electronic device in a local connection, and the requested text input is received at the electronic device via the local connection.

8. The method according to claim 1, comprising outputting the display signal displaying the requested text input received at the electronic device and confirming the text input by a user control device of the electronic device.

9. An electronic device comprising:

a display configured to output display signals for receiving input from a user of the electronic device;

a communication component configured to send information to a communication device addressed by an identifier of an identity module of the communication device and to receive information from the communication device; and a processor configured to:

control the display to output a display signal for displaying a text field for receiving input comprising text entered by the user of the electronic device;

control the communication component to send a request for text input to the communication device and to receive the requested text input from the communication device;

wherein:

the communication device is also used by the user of the electronic device, obtaining the requested text input from the communication device comprises displaying the text field for inputting the text at the communication device, to enable the user of the electronic device to provide input requested at the electronic device by interacting instead with the communication device, the communication component is configured to send the request for text input in a SMS message, and the SMS message comprises a telephone number to indicate origin of the SMS, and the electronic device receives the requested text input from a response SMS message sent to the telephone number of origin.

10. The electronic device of claim 9, wherein:

the display is configured to output the display signal displaying the requested text input received at the electronic device; and the processor is configured to receive a confirmation of the text input, from a user control device, and the user control device is different from the communication device.

11. The electronic device of claim 9, wherein the communication component is configured to receive, in response to outputting the display signal, a selection to send the text via a communication device.

12. The electronic device of claim 11, wherein the communication component is configured to receive the selection from a user control device, the user control device being different from the communication device.

13. The electronic device of claim 9, wherein the communication component is configured to send the request for text input over a mobile cellular network, with the identifier of the communication device being an identifier in the mobile cellular network.

14. The electronic device of claim 9, wherein the request for text input comprises a link to the Internet, the link comprising a text input field, and the electronic device receives the requested text input from a site corresponding to the link.

15. The electronic device of claim 9, wherein the request for text input comprises address of the electronic device in a local connection, and the requested text input is received at the electronic device via the local connection.

* * * * *